United States Patent
Rhee

(10) Patent No.: US 9,509,360 B2
(45) Date of Patent: Nov. 29, 2016

(54) ELECTRONIC DEVICE AND METHOD OF TRANSMITTING DATA BETWEEN ELECTRONIC DEVICE AND FLIP COVER THEREOF

(71) Applicant: Samsung Electronics Co., Ltd., Gyeonggi-do (KR)

(72) Inventor: Bongjae Rhee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/676,684

(22) Filed: Apr. 1, 2015

(65) Prior Publication Data

US 2015/0280770 A1    Oct. 1, 2015

(30) Foreign Application Priority Data

Apr. 1, 2014    (KR) .................. 10-2014-0038819

(51) Int. Cl.
| | | |
|---|---|---|
| *H04M 1/00* | (2006.01) | |
| *H04B 1/3888* | (2015.01) | |
| *H04B 10/116* | (2013.01) | |
| *H04M 1/18* | (2006.01) | |
| *H04M 1/725* | (2006.01) | |
| *H04M 1/02* | (2006.01) | |

(52) U.S. Cl.
CPC .......... *H04B 1/3888* (2013.01); *H04B 10/116* (2013.01); *H04M 1/185* (2013.01); *H04M 1/7253* (2013.01); *H04M 1/0245* (2013.01); *H04M 1/0266* (2013.01); *H04M 1/72575* (2013.01); *H04M 2250/12* (2013.01)

(58) Field of Classification Search
CPC .................................................... H04B 1/3888
USPC ...................................................... 455/575.8
See application file for complete search history.

(56) References Cited

U.S. PATENT DOCUMENTS

| | | | | |
|---|---|---|---|---|
| 6,466,202 B1 * | 10/2002 | Suso | ..................... | G06F 1/1616 345/158 |
| 7,120,474 B1 * | 10/2006 | Sharp | .................. | H04M 1/0214 379/433.04 |

(Continued)

FOREIGN PATENT DOCUMENTS

| | | |
|---|---|---|
| EP | 2 704 404 A1 | 3/2014 |
| KR | 10-1249938 | 3/2013 |

(Continued)

OTHER PUBLICATIONS

Extended European Search Report dated Sep. 25, 2015 in connection with European Patent Application No. 15159871.1; 8 pages.

(Continued)

*Primary Examiner* — Sanh Phu

(57) ABSTRACT

An electronic device includes a flip cover connected thereto. The electronic device includes a first display. The flip cover includes: a first surface that includes a second display; a second surface that is opposite to the first display and includes at least one light receiving unit; and a second control unit that controls the flip cover to receive light emitted from the first display through the light receiving unit, to covert the received light to an electrical signal, and to display information on the second display on the basis of the converted electrical signal.

17 Claims, 12 Drawing Sheets

(56) References Cited

U.S. PATENT DOCUMENTS

| | | |
|---|---|---|
| 2004/0014485 A1 | 1/2004 | Sugauchi et al. |
| 2006/0264243 A1 | 11/2006 | Aarras |
| 2011/0290686 A1 | 12/2011 | Huang |
| 2012/0194448 A1 | 8/2012 | Rothkopf |
| 2013/0050164 A1 | 2/2013 | Rericha |
| 2013/0076614 A1 | 3/2013 | Ive et al. |
| 2013/0109438 A1 | 5/2013 | Kwack et al. |
| 2014/0241732 A1 | 8/2014 | Ishida et al. |

FOREIGN PATENT DOCUMENTS

| | | |
|---|---|---|
| KR | 20130046846 A | 5/2013 |
| WO | WO 2013/077334 A1 | 5/2013 |

OTHER PUBLICATIONS

International Search Report dated Jun. 25, 2015 in connection with International Application PCT/KR2015/002769; 5 pages.

\* cited by examiner

ELECTRONIC DEVICE AND METHOD OF TRANSMITTING DATA BETWEEN ELECTRONIC DEVICE AND FLIP COVER THEREOF

CROSS-REFERENCE TO RELATED APPLICATION(S) AND CLAIM OF PRIORITY

The present application is related to and claims priority from and the benefit under 35 U.S.C. §119(a) of Korean Patent Application No. 10-2014-0038819, filed on Apr. 1, 2014, which is hereby incorporated by reference for all purposes as if fully set forth herein.

TECHNICAL FIELD

The present disclosure relates to an electronic device and a method of transmitting data between an electronic device and a flip cover thereof, and more particularly to an electronic device for transmitting data to a flip cover by using a display mounted on the electronic device.

BACKGROUND

Covers made of various kinds of soft materials such as jelly, plastic, rubber, leather, and fabric have been introduced to cover at least a part of a portable electronic device such as a smart phone or a tablet PC. Such covers prevent a portable electronic device from being damaged by scratches or impacts. In addition to protecting a portable electronic device, the covers serve as fashion accessories that are manufactured or selected according to users' tastes and preferences.

For example, the covers may be roughly classified into a case type cover that is mounted in such a manner as to surround the side and rear surfaces of a portable electronic device while exposing the front surface of a portable electronic device where the screen of the portable electronic device exists; a container type cover that can house a portable electronic device; and a flip cover that is coupled onto the rear or side surface of a portable electronic device and has a lid for protecting the front surface of the portable electronic device where the screen of the portable electronic device exists.

The case type cover allows a user to have direct access to the screen of a portable electronic device, but may be inferior to the flip type cover in terms of screen protection. The flip cover may protect the front surface of a portable electronic device, but additionally requires a user to open or close the lid of the flip cover when beginning to use the portable electronic device or after finishing using the portable electronic device.

To remedy this drawback, research has recently been conducted to provide simple information to a user even while a flip cover is closed by equipping the flip cover with a transparent window or a display.

SUMMARY

To address the above-discussed deficiencies, it is a primary object to provide an apparatus for transmitting data from an electronic device to a flip cover thereof without a separate physical interface between the electronic device and the flip cover by using a display included in the electronic device.

Further, various embodiments of the present disclosure provide an apparatus for supplying a flip cover of an electronic device with power by using a display included in the electronic device.

According to various embodiments of the present disclosure, there is provided a flip cover that is foldably connected to an electronic device including a first display so as to have opened and closed states. The flip cover includes: a first surface that includes a second display; a second surface that is opposite to the first display and includes at least one light receiving unit that receives light emitted from the first display; and a second control unit that controls the flip cover to receive data from the electronic device through the light receiving unit and to display the received data on the second display. The second surface further includes a first solar cell that receives light emitted from the first display and generates power by using the received light when the flip cover is in the closed state. The second surface further includes a light transmitting unit and transmits data to the electronic device through the light transmitting unit. The light transmitting unit transmits data to the electronic device in a serial manner. Further, the light receiving unit receives data from the first display in a parallel manner. The first surface further includes a second solar cell.

According to various embodiments of the present disclosure, there is provided a flip cover that is connectable to an electronic device including a first display. The flip cover includes: a first surface that includes a second display; a second surface that is opposite to the first display and includes at least one light receiving unit; and a second control unit that controls the flip cover to receive light emitted from the first display through the light receiving unit, to covert the received light to an electrical signal, and to display information on the second display on the basis of the converted electrical signal. The second surface further includes a first solar cell that receives light emitted from the first display and generates power by using the received light. The second surface further includes a light transmitting unit and transmits data to the electronic device through the light transmitting unit. The light transmitting unit transmits data to the electronic device in a serial manner. Further, the light receiving unit receives data from the first display in a parallel manner. The first surface further includes a second solar cell.

According to various embodiments of the present disclosure, there is provided an electronic device that is connectable to a flip cover having opened and closed states. The electronic device includes: a first display; a sensor unit; and a first control unit that determines whether the flip cover is in the opened or closed state on the basis of an output from the sensor unit and, when the flip cover is in the closed state, controls the electronic device to transmit data to the flip cover by displaying a data pattern on a first region of the first display. The data pattern has a brightness that varies corresponding to a binary value of the data. The first control unit divides the first region into at least two sub-regions and displays a pattern corresponding to a binary value of the data on each sub-region. The first control unit adjusts the brightness of a second region of the first display so as to enable a first solar cell included in the flip cover to generate power. The sensor unit receives data transmitted from the flip cover. The first control unit processes the data in a serial manner.

According to various embodiments of the present disclosure, there is provided an electronic device that is connectable to a flip cover including a light receiving unit and a second display. The electronic device includes: a first display; a sensor unit; and a first control unit that, on the basis of a signal output from the sensor unit, controls the electronic device to be operated in a first mode for displaying an image on the first display or in a second mode for transmitting data to the flip cover. The first display displays a plurality of patterns corresponding to a binary value of the data on a first region of the first display in the second mode. The first region can be positioned opposite to the light receiving unit of the flip cover. The flip cover further includes a first solar cell, and the first display adjusts the brightness of a second region of the first display in the second mode so as to enable the first solar cell of the flip cover to generate power. The second region of the first display can be positioned opposite to the first solar cell of the flip cover. The sensor unit receives data from the flip cover in a serial manner. The electronic device further includes a camera and receives data from the flip cover through the camera in a serial manner.

According to various embodiments of the present disclosure, there is provided an electronic device. The electronic device includes: a first display; a sensor unit; a body that accommodates the first display and the sensor unit; a flip cover that is foldably connected to the body so as to have opened and closed states, includes a first solar cell, a light receiving unit, and a light transmitting unit on a second surface thereof that is folded onto the body in the closed state, and includes a second display on a first surface thereof; and a first control unit that controls the electronic device to operate the first display in a first mode when the flip cover is in the opened state and to operate the first display in a second mode when the flip cover is in the closed state. The first display displays a plurality of patterns corresponding to a binary value of data on a first region of the first display in the second mode. The first region can be positioned opposite to the light receiving unit of the flip cover when the flip cover is in the closed state. The first display adjusts the brightness of a second region of the first display in the second mode so as to charge the first solar cell of the flip cover. The second region can be positioned opposite to the first solar cell when the flip cover is in the closed state. The sensor unit can be positioned on the body in such a manner as to be opposite to the light transmitting unit when the flip cover is in the closed state. The sensor unit receives data that is transmitted from the flip cover in a serial manner. The light receiving unit of the flip cover receives data through the plurality of patterns displayed on the first display in a parallel manner.

According to the above described various embodiment of the present disclosure, the flip cover including the second display can received data, which is to be displayed on the second display of the flip cover, by using the first display of the body of the electronic device, and therefore data communication can be performed between the body and the flip cover without a separate physical interface.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
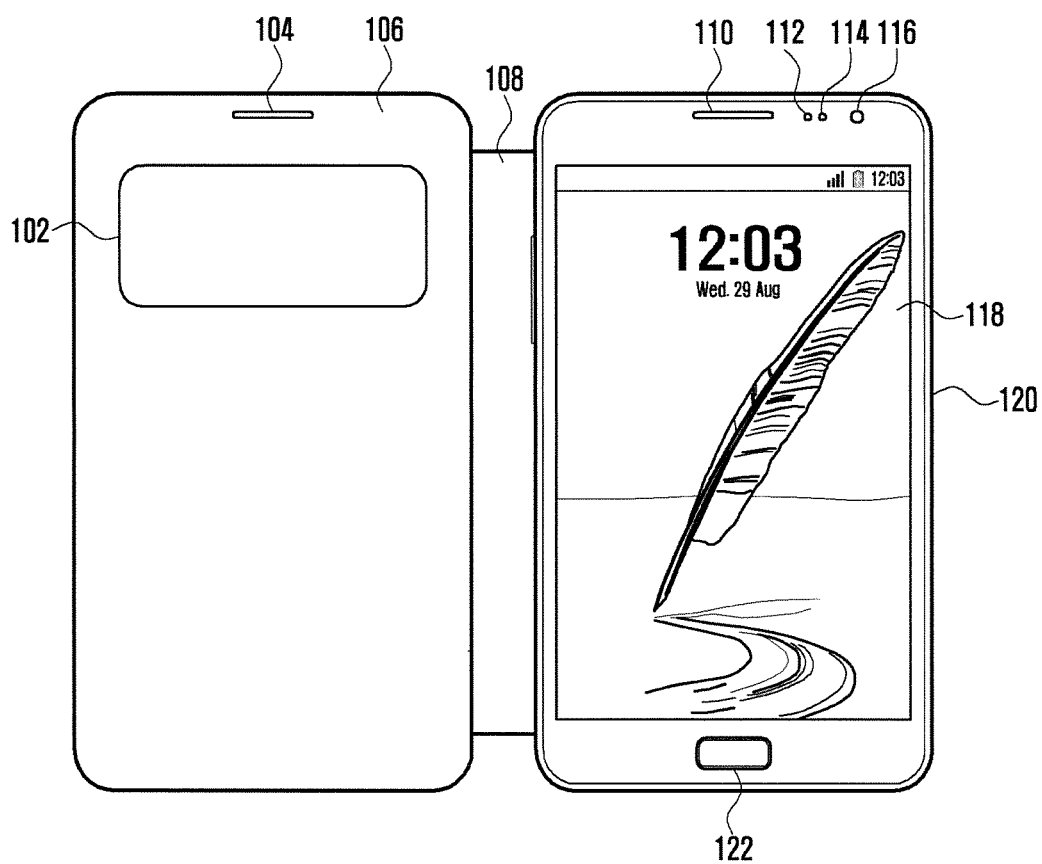
FIG. 1 illustrates a flip cover.

FIGS. 1 through 6b, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system. Hereinafter, embodiments of the present disclosure will be described in more detail with reference to the accompanying drawings to allow those skilled in the art to easily implement the present disclosure. However, the present disclosure may be implemented in various different forms and is not limited to embodiments described herein. In addition, parts irrelevant to the present disclosure are omitted in the drawings in order to make the present disclosure clear, and the same reference numerals are designated to the same or similar parts throughout the specification.

In the following, essential elements required to minimally implement the present disclosure will be described, and the present disclosure may be implemented by adding other elements to the essential elements.

Although ordinal terms such as "first" and "second" may be used to describe various elements, these elements are not limited by the teens. The terms are used merely for the purpose of distinguishing one element from any other element. For example, without departing from the scope of protection of the present disclosure, a first element may be named a second element, and likewise, a second element may also be named a first element. As used herein, the term "and/or" includes any one of one or more associated items and any combination thereof.

As used herein, the singular forms are intended to include the plural forms as well, unless the context clearly indicates otherwise. As used herein, it should be understood that the term "include" or "have" refers to the existence of a feature, a numeral, a step, an operation, an element, a component, or a combination thereof, and does not exclude the possibility of the existence or addition of one or more other features, numerals, steps, operations, elements, components, or combinations thereof in advance.

An electronic device according to various embodiments of the present disclosure includes, but is not limited to, a mobile phone, a smart phone, a laptop computer, a tablet personal computer (PC), an e-book terminal, a digital broadcasting terminal, a personal digital assistant (PDA), a portable multimedia player (PMP), a navigation device, a wearable terminal, and the like.

FIG. 1 illustrates a flip cover of the prior art. Referring to FIG. 1, the flip cover 106 is foldably mounted to an electronic device 120. The electronic device 120 includes a display 118, a home button 122, a speaker 110, an ambient light and proximity sensor 112, 114, and a camera 116.

The ambient light and proximity sensor 112, 114 includes a light emitting unit that emits infrared light and a light receiving unit that receives reflected infrared light, and includes a hole 112 for the light emitting unit and a hole 114 for the light receiving unit. The light emitting unit includes an infrared emitting diode. The light receiving unit includes at least one photodiode. The ambient light and proximity sensor 112, 114 simultaneously serves as a proximity sensor, a light sensor, and a gesture sensor.

In the case of serving as a proximity sensor, when an object approaches the ambient light and proximity sensor, infrared light emitted from the light emitting unit and reflected by the object is received by the light receiving unit, and accordingly the ambient light and proximity sensor outputs a signal corresponding to the proximity of the object. A control unit turns the screen on or off based on the signal. The function of the ambient light and proximity sensor as a proximity sensor is used to detect whether a user puts the electronic device 120 up to his or her ear during a phone call or views the screen of the electronic device 120, and the control unit reduces power consumption by turning off the screen when a user puts the electronic device 120 up to his or her ear.

In the case of serving as a light sensor, the ambient light and proximity sensor outputs a signal corresponding to an ambient brightness. The control unit adjusts the state of the screen on the basis of the signal. The function of the ambient light and proximity sensor as a light sensor is used to detect ambient brightness or illumination and correspondingly adjust the brightness or color of the screen.

In the case of serving as a gesture sensor, infrared light emitted from the light emitting unit and reflected by an object approaching the ambient light and proximity sensor is received by a plurality of photodiodes constituting the light receiving unit, and accordingly the ambient light and proximity sensor outputs a signal corresponding to the movement and direction of the approaching object. The control unit detects the movement and direction of the approaching object on the basis of the signal.

The above-mentioned functions can also be achieved using separate proximity, light, and gesture sensors.

The flip cover 106 includes at least one of a transparent window 102, a rectangular hole 104, and a connection 108.

A user is able to see a partial region of the display 117 through the transparent window 102 while the flip cover 106 is closed.

Figure 2A:
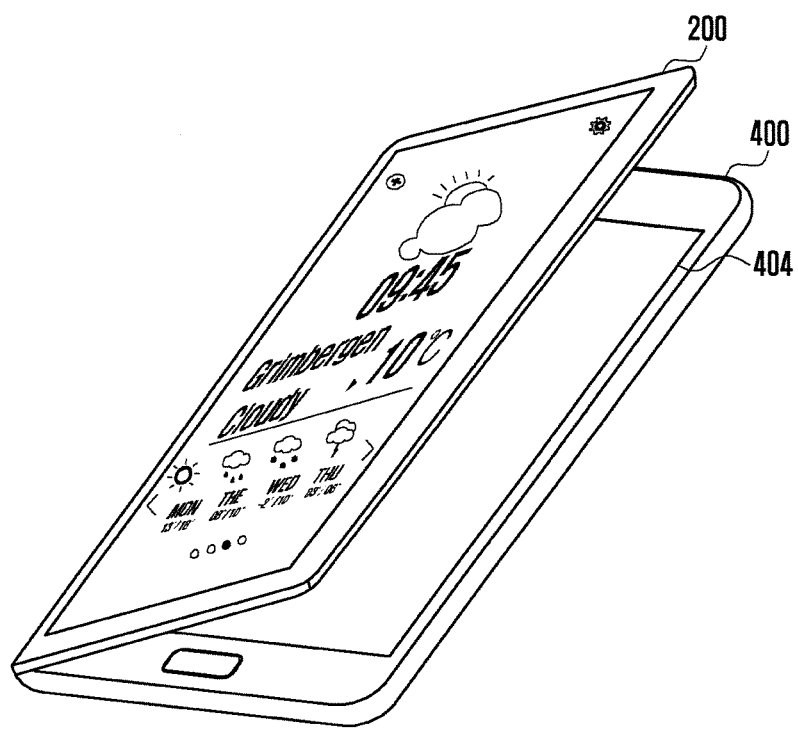
FIGS. 2A and 2B illustrate an operation of a flip cover and a screen displayed on the flip cover according to various embodiments of the present disclosure.
Figure 2B:
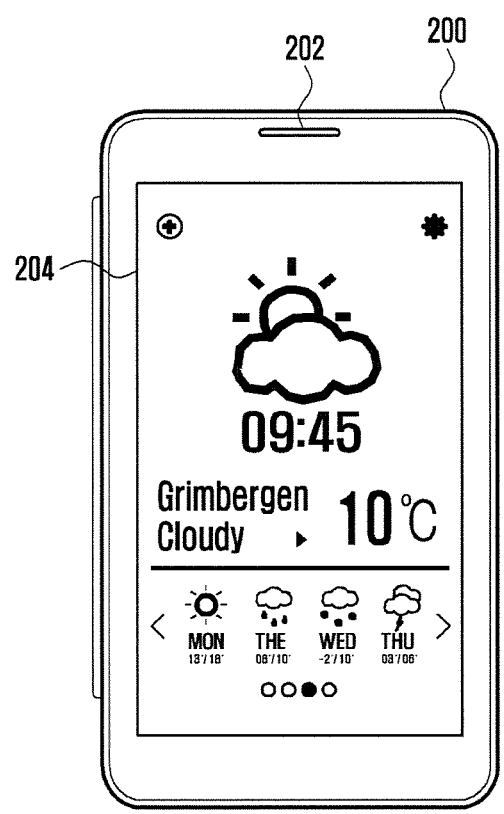

FIGS. 2A and 2B illustrate an operation of a flip cover and a screen displayed on the flip cover according to various embodiments of the present disclosure.

Referring to FIG. 2A, the flip cover 200 is connectable to an electronic device 400 including a first display 404 and is foldably mounted to the electronic device 400. Further, the flip cover 200 can be mounted to the electronic device 400 in such a manner as to cover the first display 404 of the electronic device 400. The flip cover 200 has "opened" and "closed" states and includes a first surface facing the outside in the closed state and a second surface facing the first display 404 of the electronic device 400 in the closed state. Referring to FIG. 2B, the flip cover 200 includes a speaker hole 202 and a second display 204. The speaker hole 202 is a hole or via passing through the flip cover 200 and allows sounds to be output from a speaker (not shown) of the electronic device 400 even when the flip cover 200 is in the closed state.

A second solar cell (not shown) is mounted on both sides of the speaker hole 202. The second solar cell supplies various electronic components included in the flip cover 200 with power when the flip cover 200 is in the closed state.

The flip cover 200 receives data from the electronic device 400 and displays image or text information corresponding to the data on the second display 204. The flip cover 200 receives data through the first display 404 mounted on the electronic device 400, which will be described in detail below.

As the second display 204 included in the flip cover 200, a reflective display with low power consumption, such as an electrophoretic display (hereinafter, "EPD"), can be used. For example, the power consumed to maintain an image displayed on the EPD screen of the EPD may be low, and power consumption may be required to change the image. When the EPD is included in the flip cover 200, a clock, weather information, news, stock information, and the like can be continuously displayed on the EPD screen at regular time periods or in response to information update events.

Further, an e-book can be displayed on the second display 204 of the flip cover 200. The electronic device 400 executes an e-book application and transmits information on an e-book to the second display 204. In the e-book application, a user interface for book selection, page turning, and the like are provided using the button or touch panel operation of the electronic device 400, motion sensing or speech recognition of the electronic device 400, or the like. Further, the second display 204 includes a touch screen function and, in this case, can directly receive an input from a user.

In addition, the second display 204 of the flip cover 200 is activated or deactivated depending on user actions and can also be always maintained in the active state where data or information is displayed thereon. The electronic device 400 includes a first control unit (not shown), which will be described in detail below. The first control unit detects the "opened" or "closed" state of the flip cover 200. The "opened" or "closed" state of the flip cover 200 can be detected using a magnetic sensor of the electronic device 400. The first control unit detects the "opened" or "closed" state of the flip cover 200 on the basis of a signal output from the magnetic sensor. In the closed state of the flip cover, the first control unit receives infrared light emitted from the light transmitting unit of the flip cover by using the ambient light and proximity sensor (not shown) and receives data from the flip cover.

That is, the first control unit recognizes a signal received through the ambient light and proximity sensor as data transmitted from the flip cover on the basis of a signal output from the magnetic sensor. Further, the first control unit detects an ambient brightness or an approaching object on the basis of a signal output from the magnetic sensor. For example, when the output value of the magnetic sensor is greater than a predetermined value, the first control unit determines the flip cover to be in the closed state and correspondingly recognizes a signal output from the ambient light and proximity sensor as digital data. In contrast, when the output value of the magnetic sensor is less than the predetermined value, the first control unit determines the flip cover to be in the opened state and correspondingly adjusts the overall screen brightness or completely turns off the screen depending on a signal output from the ambient light and proximity sensor.

Figure 3A:
FIGS. 3A, 3B and 3C illustrate the inner and outer surfaces of a flip cover and a side surface of the flip cover that is coupled to an electronic device according to various embodiments of the present disclosure.
Figure 3B:
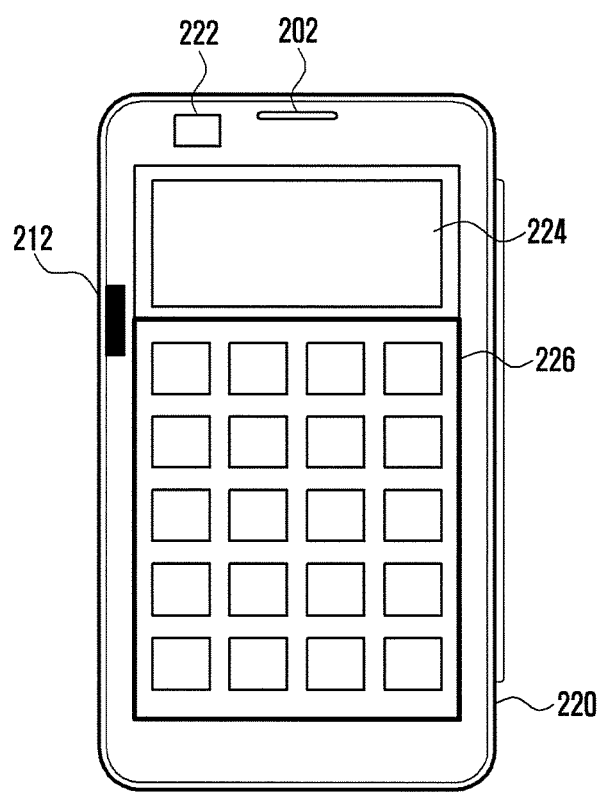
Figure 3C:
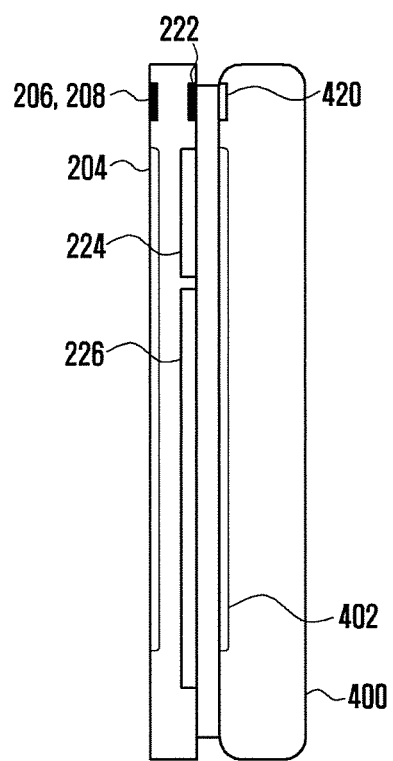

FIGS. 3A to 3C illustrate the inner and outer surfaces of a flip cover and a side surface of the flip cover that is coupled to an electronic device according to various embodiments of the present disclosure. The flip cover is connectable to an electronic device 400 including a first display 402 and includes a first surface that includes a second display 204, a second surface that is opposite to the first display and includes at least one light receiving unit 226, and a second control unit that controls the flip cover to receive light emitted from the first display through the light receiving unit 226, to covert the received light to an electrical signal, and to display information on the second display 204 on the basis of the converted electrical signal.

Referring to FIG. 3A, the first surface 210 of the flip cover 200 includes a second display 204, second solar cells 206, 208, a speaker hole 202, and a magnet 212.

When the flip cover 200 is closed, the second solar cells 206, 208 receive light from the sun and other external light sources, generate power by using the received light, and supply various electronic components included in the flip cover 200 with the generated power. Further, the second solar cells 206, 208 charge a second power supply as described below.

The second display 204 displays data received from the electronic device 400. As the second display 204, a reflective display with low power consumption, such as an EPD, can be used. For example, the power consumed to maintain an image displayed on the EPD screen of the EPD may be low, and power consumption may be required to change the image. When the EPD is included in the flip cover 200, a clock, weather information, news, stock information, and the like can be continuously displayed on the EPD screen at regular time periods or in response to information update events.

Further, an e-book can be displayed on the second display 204. The electronic device 400 executes an e-book application and transmits information on an e-book to the second display 204. In the e-book application, a user interface for book selection, page turning, and so forth is provided using the button or touch panel operation of the electronic device 400, the motion recognition or speech recognition function of the electronic device 400, or the like. Further, the second display 204 includes a touch screen function and, in this case, can directly receive an input from a user.

In addition, the second display 204 can be activated or deactivated depending upon user actions and can also be always maintained in the active state where data or information is displayed thereon.

The speaker hole 202 is a via or a hole passing through the flip cover 200 and allows sounds to be output from a speaker (not shown) of the electronic device 400 even when the flip cover 200 is in the closed state.

FIG. 3B illustrates the second surface 220 of the flip cover 200. The second surface 220 corresponds to the inner surface of the flip cover 200 and can be opposite to and face-to-face with the first display 402 included in the electronic device 40 when the flip cover 200 is in the closed state.

Referring to FIG. 3B, the second surface 220 of the flip cover 200 includes a first solar cell 224, a light receiving unit 226, a light transmitting unit 222, a speaker hole 202, and a magnet 212.

When the flip cover 200 is opened, the first solar cell 224 receives light from the sun and other external light sources, generates power by using the received light, and supplies various electronic components included in the flip cover 200 with the generated power. In addition, when the flip cover 200 is closed, the first solar cell 224 receives light emitted from the opposite first display 402 of the electronic device 400, generates power by using the received light, and supply various electronic components included in the flip cover 200 with the generated power.

The light receiving unit 226 includes a plurality of phototransistors. Each phototransistor constituting the light receiving unit 226 receives light from the first display 402 of the electronic device 400 and generates an electrical signal in response thereto. For example, each phototransistor outputs a signal corresponding to a binary value of "1" if a corresponding region of the first display 402 of the electronic device 400, which corresponds to each phototransistor, is turned on or brightly displayed. In contrast, each phototransistor outputs a signal corresponding to a binary value of "0" if a corresponding region of the first display 402 of the electronic device 400, which corresponds to each phototransistor, is darkly displayed or turned off.

The plurality of phototransistors arranged in the light receiving unit 226 receives data from the first display 402 of the electronic device 400 in a parallel manner. When data is received in a parallel manner, a plurality of pieces of data can be processed at once, which can result in a relatively increased data transmission rate, compared to when data is received in a serial manner, that is, when one piece of data is processed at a time. In order to receive data in a parallel manner, the light receiving unit 226 includes at least two phototransistors. As an example, eight phototransistors are required to transmit data 1 byte at a time. As another example, sixteen phototransistors are required to transmit data 2 bytes at a time. Further, at least one additional phototransistor can be used to ensure the reliability of data transmission.

The light transmitting unit 222 includes an infrared emitting diode and transmits data from the flip cover 200 to a sensor unit 420 of the electronic device 420. The light transmitting unit 222 transmits data to the sensor unit 420 of the electronic device 420 in a serial manner. When data is transmitted in a serial manner, one piece of data is processed at a time, which can result in a relatively decreased data transmission rate, compared to when data is transmitted in a parallel manner. Since the light transmitting unit 222 transmits data in a serial manner, it has limitations in transmitting large amounts of data, and therefore can be mainly used to inform the electronic device 400 of the state of the flip cover 200. For example, the light transmitting unit 222 can inform the electronic device 400 of the states of charge of the first solar cell 224, the second solar cells 206, 208, and the second power supply (not shown) included in the flip cover 200. Further, when the second display 204 has a touch screen function, the light transmitting unit 22 transfers a signal corresponding to a user input to the electronic device 400.

The magnet 212 generates magnetic flux. When a magnetic sensor is included in the electronic device 400, the electronic device 400 determines whether the flip cover is in the "opened" or "closed" state by sensing the magnetic flux output from the magnet 212 through the magnetic sensor. Further, the magnet 212 causes the flip cover 200 to come in close contact with the electronic device 400.

FIG. 3C illustrates a side view of the flip cover 200 coupled to the electronic device 400. Referring to FIG. 3C, the electronic device 400, the first display 402 of the electronic device, the sensor unit 420, the second display 204 mounted on the flip cover 200, the first solar cell 224, the light receiving unit 226, and the light transmitting unit 222 are shown in the drawing.

When the flip cover 200 is in the closed state, the first solar cell 224 and the light receiving unit 226 receives light from the first display 402 of the electronic device 400 because they are face-to-face with the first display 402. When the flip cover 200 is in the closed state, the first solar cell 224 receives light from the first display 402, converts the received light to electrical energy, and supplies various electronic components included in the flip cover 200 with power. Further, when the flip cover 200 is in the opened state, the first solar cell 224 receives light from the sun and other external light sources and generates power by using the received light.

The second solar cells 206, 208 receives light from the sun and other external light sources and generates power by using the received light. The electricity generated through the first solar cell 224 and the second solar cells 206, 208 are used to supply power directly to various electronic components included in the flip cover 200, for example, the second display 204, the light receiving unit 226, the light transmitting unit 222, and the second control unit as described below, or charge the second power supply including batteries.

The light receiving unit 226 receives light from the first display 402, converts the received light to an electrical signal that corresponds to a binary value of "1" or "0" depending upon the strength or existence of the light, and outputs the converted electrical signal.

The light transmitting unit 222 can be positioned opposite to the sensor unit 420 of the electronic device 400 when the flip cover 200 is in the closed state. That is, when the flip cover is in the closed state, the light transmitting unit 222 can be placed face-to-face with the sensor unit 420.

The sensor unit 420 includes a proximity sensor, a light sensor, and a gesture sensor. Alternatively, the sensor unit 420 includes an ambient light and proximity sensor into which a proximity sensor, a light sensor, and a gesture sensor are incorporated. The ambient light and proximity sensor combines the functions of a proximity sensor, a light sensor, and a gesture sensor. The sensor unit 420 receives light from the light transmitting unit 222 of the flip cover 200 and transfers information on the state of the flip cover, such as the opened or closed state of the flip cover or the state of charge of the second power supply, to the electronic device 400 on the basis of the received light. The light transmitting unit 222 can be an infrared emitting diode and can emit infrared light in order to inform the electronic device 400 of the state of the flip cover 200. The first solar cell 224 and the light receiving unit 226 can be positioned opposite to the first display 402. That is, the first solar cell 224 and the light receiving unit 226 can be face-to-face with the first display 402.

Figure 4A:
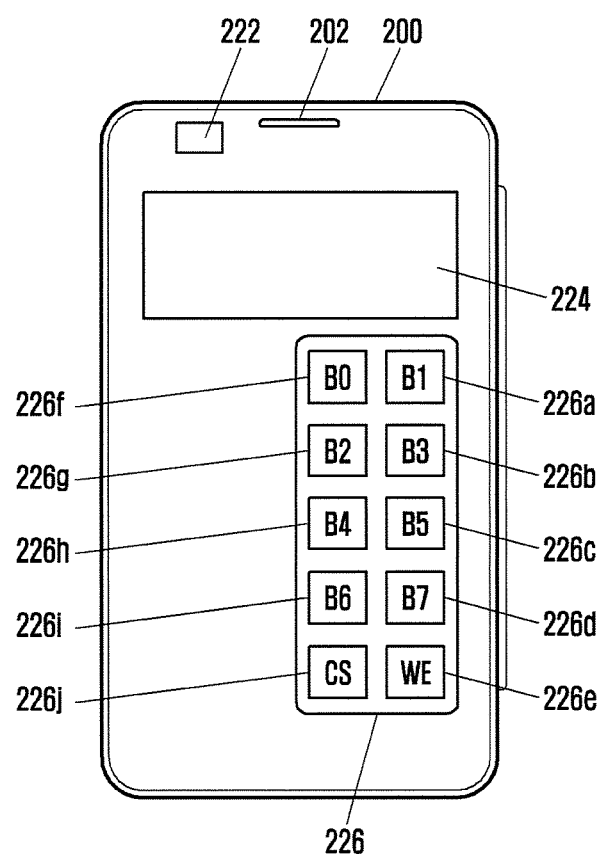
FIGS. 4A and 4B illustrate a data transmission method between a flip cover and an electronic device according to various embodiments of the present disclosure.
Figure 4B:
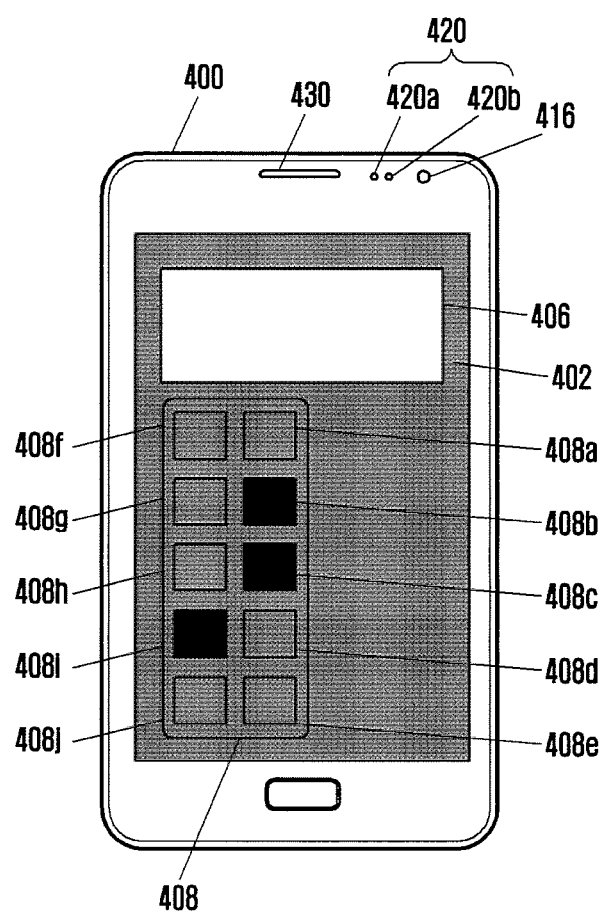

FIGS. 4A and 4B illustrate a data transmission method between a flip cover and an electronic device according to various embodiments of the present disclosure. The flip cover can be placed in opened and closed states and can be foldably connected to the electronic device.

Referring to FIG. 4A, the light receiving unit 226, the first solar cell, 224, the light transmitting unit 222, and the speaker hole 202 included on the first surface of the flip cover 200 are shown in the drawing. The first surface can be the inner surface of the flip cover 200 and can be a surface that is face-to-face with the electronic device 400 when the flip cover 200 is closed.

The light receiving unit 226 includes a plurality of phototransistors 226a, 226b, 226c, 226d, 226e, 226f, 226g, 226h, 226i, 226j. Each of the plurality of phototransistors 226a, 226b, 226c, 226d, 226e, 226f, 226g, 226h, 226i, 226j receive light from the first display 402 of the electronic device 400 and generate an electrical signal corresponding to a binary value of "1" or "0" on the basis of the received light. That is, each of the plurality of phototransistors 226a, 226b, 226c, 226d, 226e, 226f, 226g, 226h, 226i, 226j generate an electrical signal corresponding to a binary value of "1" or "0" in response to each data pattern displayed on the first display 402 of the electronic device 400. The electronic device 400 transmits data to the flip cover 200 by displaying, on the first display 402, a predetermined data pattern corresponding to data to be transmitted to the flip cover 200.

The electronic device 400 transmits data in a parallel manner because it can simultaneously transmit as many pieces of data as the number of the plurality of phototransistors 226a, 226b, 226c, 226d, 226e, 226f, 226g, 226h, 226i, 226j. For example, if eight phototransistors are used, then 8 bits of data can be transmitted at a time.

Referring to FIG. 4B, the first display 402, the sensor unit 420, and the camera 416 included in the electronic device 400 are shown in the drawing. The first display 402 includes a first region 408 and a second region 406. The flip cover 200 is foldably connected to the electronic device 400. The electronic device 400 determines whether the flip cover 200 is in the "opened" or "closed" state on the basis of an output from the sensor unit 420. More specifically, the first control unit of the electronic device 1 determines whether the flip cover 200 is in the "opened" or "closed" state on the basis of an output from the sensor unit 420. The "opened" or "closed" state of the flip cover 200 can be discovered by analyzing a signal output from the ambient light and proximity sensor or the magnetic sensor included in the sensor unit. For example, the magnitude of a signal output from the magnetic sensor in the sensor unit can be maximal when the flip cover 200 is in the "closed" state. A magnet that cooperates with the magnetic sensor included in the electronic device 400 can be mounted on the flip cover 200. The magnitude of a signal output from the magnetic sensor gradually increases as the flip cover 200 approaches the electronic device 400 and then has the maximum value at the moment when the flip cover 200 comes in close contact with the electronic device 400.

If the magnitude of the signal is greater than a threshold value, then the first control unit determines the flip cover 200 to be in the "closed" state. When the flip cover is determined to be in the "closed" state, the first control unit controls the electronic device 400 to transmit data to the flip cover by displaying a data pattern corresponding to the data on the first region of the first display. The data pattern has a brightness that varies corresponding to a binary value of the data.

The first control unit divides the first region into at least two sub-regions and displays a data pattern corresponding to a binary value of the data on each sub-region.

The first region 408 is formed in a position opposite to the light receiving unit 226 of the flip cover 200. That is, the first region 408 is formed in a position where the first region 408 is face-to-face with the light receiving unit 226 of the flip cover 200 when the flip cover 200 is closed.

The second region 406 is formed in a position opposite to the solar cell 224 of the flip cover 200. That is, the second region 406 is formed in a position where the second region 406 is face-to-face with the first solar cell 224 of the flip cover 200 when the flip cover 200 is closed.

The first display 402 is operated in a first mode or a second mode. The first mode is a mode for displaying an image, and the second mode is a mode for transmitting data. In the first mode, the first display 402 carries out the inherent functions of the display and displays an image. In the second mode, the first display 402 is operated in a data transmission mode for displaying a data pattern, thereby transmitting data to the flip cover 200. The first control unit determines whether the flip cover 200 is in the "opened" or "closed" state on the basis of a signal output from the sensor unit. The first control unit controls the first display to be operated in the first mode for displaying an image or in the second mode for transmitting data to the flip cover depending on the determined state of the flip cover. That is, the first control unit operates the first display 402 in the first mode for displaying an image when the flip cover is in the opened state and operates the first display 402 in the second mode for transmitting data to the flip cover 200 when the flip cover 200 is in the closed state. The "opened" or "closed" state of the flip cover 200 is determined on the basis of an output from the sensor unit 420 included in the electronic device 400.

The sensor unit 420 includes the ambient light and proximity sensor 420. The ambient light and proximity sensor 420 includes a light emitting unit 420a and a light receiving unit 420b. The sensor unit 420 further includes the magnetic sensor (not shown).

For example, the ambient light and proximity sensor 420 detect external light and correspondingly output a signal. Further, the ambient light and proximity sensor 420 detect the proximity of the flip cover 200 as the flip cover 200 approaches the electronic device 400 and correspondingly output a signal. The first control unit receives the signal output from the ambient light and proximity sensor 420 and determines whether the flip cover 200 is in the "opened" or "closed" state on the basis of the received signal.

The magnetic sensor (not shown) detects magnetic flux from the magnet 212 mounted on the flip cover 200 and correspondingly outputs a signal. The first control unit receives the signal output from the magnetic sensor and determines whether the flip cover 200 is in the "opened" or "closed" state on the basis of the received signal.

If the flip cover 200 is closed, then the electronic device 400 turns off all regions other than the first region 408 and the second region 406 or allows all regions other than the first region 408 and the second region 406 to be black. The electronic device 400 displays the second region 406 at the maximum brightness level, thereby enabling the first solar cell 224 of the flip cover 200 to generate power. The electronic device 400 displays a data pattern for data transmission on the first region 408. In order to transmit data in a parallel manner, the electronic device 400 divides the first region 408 into at least two sub-regions. The electronic device 400 transmits binary data to the flip cover 200 by displaying a data pattern corresponding to a binary value of "1" or "0" on each sub-region.

For example, each sub-region can be white when a corresponding bit of data to be transmitted has a value of "1" and can be black when the corresponding bit has a value of "0". Alternatively, each sub-region can be displayed at 80% or greater of the maximum brightness level when a corresponding bit of data to be transmitted has a value of "1" and can be displayed at 20% or less of the maximum brightness level when the corresponding bit has a value of "0".

Alternatively, each sub-region is turned on when a corresponding bit of data to be transmitted has a value of "1" and is turned off when the corresponding bit has a value of "0".

The sub-regions 408a, 408b, 408c, 408d, 408e, 408f, 408g, 408h, 408i, 408j are white or black corresponding to binary value data. The sub-regions 408a, 408d, 408e, 408f, 408g, 408h, 408j are white corresponding to a binary value of "1". The sub-regions 408b, 408c, 408i are black corresponding to a binary value of "0". Further, the brightness of each sub-region varies corresponding to a binary value corresponding thereto.

In addition, the sub-regions 408a, 408b, 408c, 408d, 408e, 408f, 408g, 408h, 408i, 408j are turned on or off corresponding to binary value data. For example, the sub-regions 408a, 408d, 408e, 408f, 408g, 408h, 408j are turned on corresponding to a binary value of "1". The sub-regions 408b, 408c, 408i are turned off corresponding to a binary value of "0".

The respective sub-regions 408a, 408b, 408c, 408d, 408e, 408f, 408g, 408h, 408i, 408j correspond one-to-one to the plurality of phototransistors 226a, 226b, 226c, 226d, 226f, 226g, 226h, 226i, 226j included in the flip cover 200. The sub-region 408a corresponds to the phototransistor 226f, the sub-region 408b corresponds to the phototransistor 226g, the sub-region 408c corresponds to the phototransistor 226h, the sub-region 408d corresponds to the phototransistor 226i, the sub-region 408e corresponds to the phototransistor 226j, the sub-region 408f corresponds to the phototransistor 226a, the sub-region 408g corresponds to the phototransistor 226b, the sub-region 408h corresponds to the phototransistor 226c, the sub-region 408i corresponds to the phototransistor 226d, and the sub-region 408j corresponds to the phototransistor 226e.

For example, the white pattern displayed on the sub-region 408a can be received by the phototransistor 226f, which in turn outputs a signal corresponding to a value of "1".

The black pattern displayed on the sub-region 408b can be received by the phototransistor 226g, which in turn outputs a signal corresponding to a value of "0".

The black pattern displayed on the sub-region 408c can be received by the phototransistor 226h, which in turn outputs a signal corresponding to a value of "0".

The white pattern displayed on the sub-region 408d can be received by the phototransistor 226i, which in turn outputs a signal corresponding to a value of "1".

The white pattern displayed on the sub-region 408e can be received by the phototransistor 226j, which in turn outputs a signal corresponding to a value of "1".

The white pattern displayed on the sub-region 408f can be received by the phototransistor 226a, which in turn outputs a signal corresponding to a value of "1".

The white pattern displayed on the sub-region 408g can be received by the phototransistor 226b, which in turn outputs a signal corresponding to a value of "1".

The white pattern displayed on the sub-region 408h can be received by the phototransistor 226c, which in turn outputs a signal corresponding to a value of "1".

The black pattern displayed on the sub-region 408i can be received by the phototransistor 226d, which in turn outputs a signal corresponding to a value of "0".

The white pattern displayed on the sub-region 408j can be received by the phototransistor 226e, which in turn outputs a signal corresponding to a value of "1".

In addition, the plurality of phototransistors 226 outputs a signal corresponding to a binary value of "1" or "0" depending on the "on" or "off" state of the sub-regions 408. For example, the sub-region 408a can be in the "on" state and the phototransistor 226f outputs a signal corresponding to a value of "1".

The sub-region 408b can be in the "off" state and the phototransistor 226g outputs a signal corresponding to a value of "0".

The sub-region 408c can be in the "off" state and the phototransistor 226h outputs a signal corresponding to a value of "0".

The sub-region 408d can be in the "on" state and the phototransistor 226i outputs a signal corresponding to a value of "1".

The sub-region 408e can be in the "on" state and the phototransistor 226j outputs a signal corresponding to a value of "1".

The sub-region 408f can be in the "on" state and the phototransistor 226a outputs a signal corresponding to a value of "1".

The sub-region 408g can be in the "on" state and the phototransistor 226b outputs a signal corresponding to a value of "1".

The sub-region 408h can be in the "on" state and the phototransistor 226c outputs a signal corresponding to a value of "1".

The sub-region 408i can be in the "off" state and the phototransistor 226d outputs a signal corresponding to a value of "0".

The sub-region 408j can be in the "on" state and the phototransistor 226e outputs a signal corresponding to a value of "1".

When the phototransistor is formed as an integrated phototransistor capable of detecting red, green, and blue respectively, it is possible to simultaneously transmit 3 bits. In this case, if each sub-region 408 of the first display 402 of the electronic device 400 is displayed using red, green, and blue light corresponding to a binary value, the phototransistor capable of detecting red, green, and blue respectively acquires 3 bit-digital data that is determined according to whether red, green, and blue values are detected respectively. For example, when a binary value of "100" is transmitted to the flip cover 200, the sub-region in the first display is displayed such that red is turned on, green is turned off, and blue is turned off, and the corresponding phototransistor detects this RGB pattern and outputs a signal corresponding to a binary value of "100".

The second region can be displayed at the maximum brightness level. The electronic device 400 adjusts the brightness of the first display 402 so as to enable the first solar cell 224 of the flip cover 200 to generate power. The first solar cell 224 of the flip cover 200 receives light from an image displayed at the maximum brightness level on the second region 406 of the first display 402, generated power by using the received light, and supplies the flip cover 200 with the generated power.

The first control unit as described below receives data, transmitted from the light transmitting unit 22 of the flip cover 200, through the sensor unit 420 and adjusts the brightness of the second region 406 of the first display 402 on the basis of a signal output from the sensor unit 420. For example, the first control unit receives data transmitted from the flip cover 200, checks the state of charge of the second power supply 244 included in the flip cover 200 on the basis of the received data, and correspondingly adjusts the brightness of the second region 406. When the state of charge of the second power supply 244 corresponds to a full state of charge, the first control unit turns off the second region 406 or adjusts the brightness of the second region to the minimum level. When the state of charge of the second power supply 244 corresponds to a low state of charge, the first control unit adjusts the brightness of the second region 406 to the maximum level or, thereby enabling the first solar cell 224 to generate power and charge the second power supply 244 with the generated power.

Figure 5A:
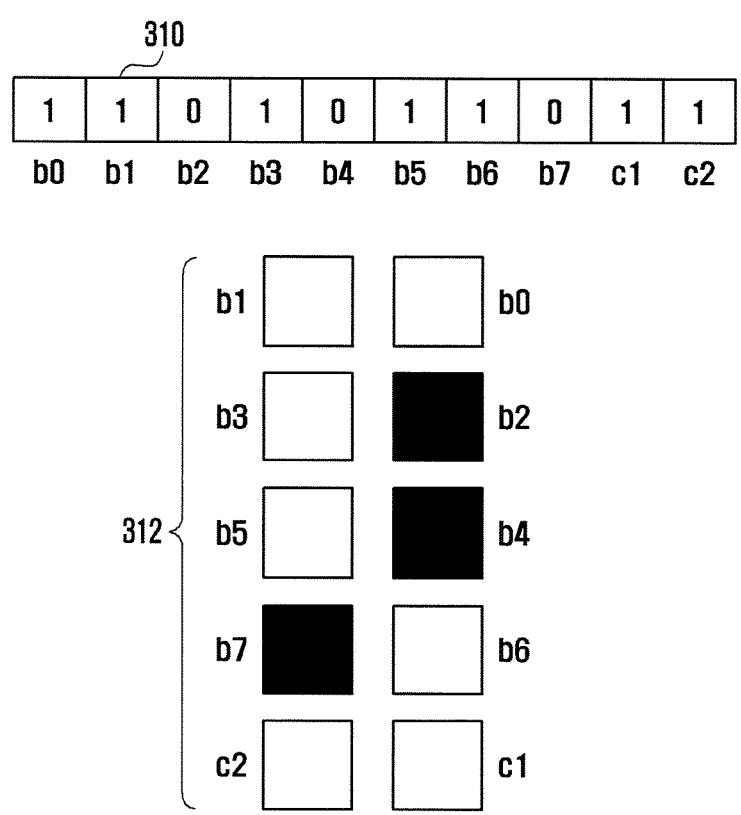
FIGS. 5A and 5B each illustrate an example of a data format and a corresponding data pattern displayed on a first display of an electronic device according to various embodiments of the present disclosure.
Figure 5B:
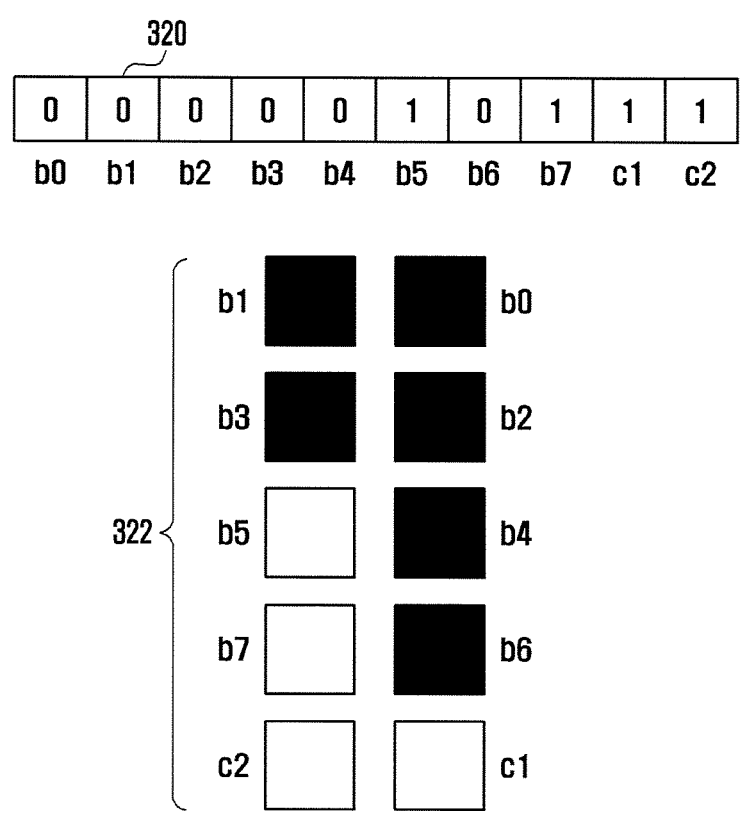

FIGS. 5A and 5B illustrate examples of a data pattern displayed on the first display of the electronic device according to various embodiments of the present disclosure.

Referring to FIG. 5A, data 310 to be transmitted to the flip cover and a data pattern 312 corresponding thereto are shown in the drawing. The data 310 includes eight data bits b0, b1, b2, b3, b4, b5, b6, b7 and two control bits c1, c2. Each bit has a value of "0" or "1". For example, the data 310 may have of binary value of "1101011011", and the control unit can display the data pattern 312 in order to transmit the data 310 to the flip cover.

The data pattern 312 includes ten divided sub-regions b0, b1, b2, b3, b4, b5, b6, b7, c1, c2. When a bit to be transmitted has a value of "0", a corresponding sub-region of the first region of the first display is black or is turned off. When a bit to be transmitted has a value of "1", a corresponding sub-region of the first region of the first display is white or is turned on.

For example, data bit b0 can have a value of "1" and sub-region b0 corresponding thereto can be white or turned on.

Data bit b1 can have a value of "1" and sub-region b1 corresponding thereto can be white or turned on.

Data bit b2 can have a value of "0" and sub-region b2 corresponding thereto can be black or turned off.

Data bit b3 can have a value of "1" and sub-region b3 corresponding thereto can be white or turned on.

Data bit b4 can have a value of "0" and sub-region b4 corresponding thereto can be black or turned off.

Data bit b5 can have a value of "1" and sub-region b5 corresponding thereto can be white or turned on.

Data bit b6 can have a value of "1" and sub-region b6 corresponding thereto can be white or turned on.

Data bit b7 can have a value of "0" and sub-region b7 corresponding thereto can be black or turned off.

Control bit c1 can have a value of "1" and sub-region c1 corresponding thereto can be white or turned on.

Control bit c2 can have a value of "1" and sub-region c2 corresponding thereto can be white or turned on.

Referring to FIG. 5b, data 320 to be transmitted to the flip cover and a data pattern 322 corresponding thereto are shown in the drawing. The data 320 includes eight data bits b0, b1, b2, b3, b4, b5, b6, b7 and two control bits c1, c2. Each bit has a value of "0" or "1". For example, the data 320 may have of binary value of "0000010111", and the control unit can display the data pattern 322 in order to transmit the data 320 to the flip cover.

The data pattern 322 includes ten divided sub-regions b0, b1, b2, b3, b4, b5, b6, b7, c1, c2. When a bit to be transmitted has a value of "0", a corresponding sub-region of the first region of the first display is black or is turned off. When a bit to be transmitted has a value of "1", a corresponding sub-region of the first region of the first display is white or is turned on.

For example, data bit b0 can have a value of "0" and sub-region b0 corresponding thereto can be black or turned off.

Data bit b1 can have a value of "0" and sub-region b1 corresponding thereto can be black or turned off.

Data bit b2 can have a value of "0" and sub-region b2 corresponding thereto can be black or turned off.

Data bit b3 can have a value of "0" and sub-region b3 corresponding thereto can be black or turned off.

Data bit b4 can have a value of "0" and sub-region b4 corresponding thereto can be black or turned off.

Data bit b5 can have a value of "1" and sub-region b5 corresponding thereto can be white or turned on.

Data bit b6 can have a value of "0" and sub-region b6 corresponding thereto can be black or turned off.

Data bit b7 can have a value of "1" and sub-region b7 corresponding thereto can be white or turned on.

Control bit c1 can have a value of "1" and sub-region c1 corresponding thereto can be white or turned on.

Control bit c2 can have a value of "1" and sub-region c2 corresponding thereto can be white or turned on.

Figure 6A:
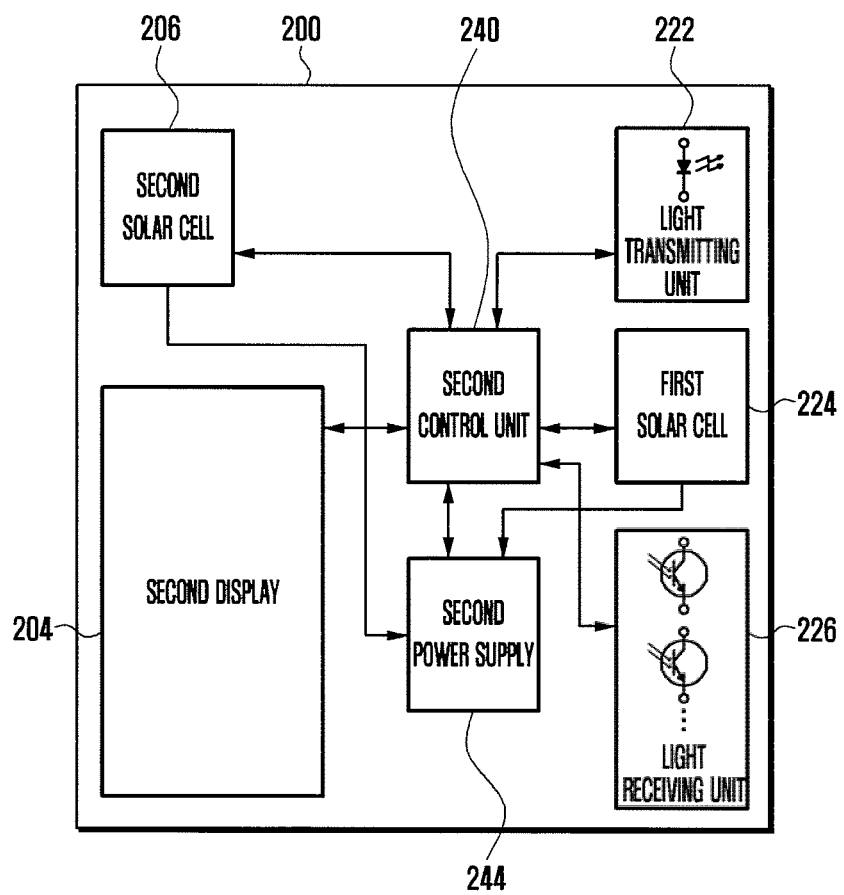
FIGS. 6A and 6B are block diagrams of a flip cover and an electronic device according to various embodiments of the present disclosure.
Figure 6B:
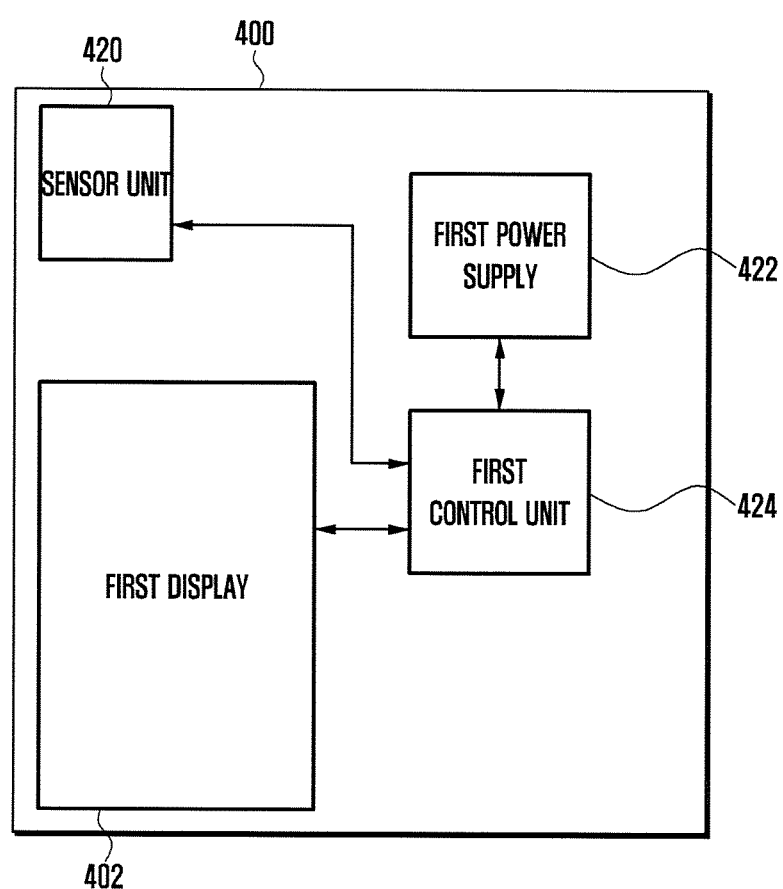

FIGS. 6A and 6B illustrate internal block diagrams of a flip cover and an electronic device according to various embodiments of the present disclosure.

Referring to FIG. 6A, the flip cover 200, the first solar cell 224, the light receiving unit 226, the second control unit 240, the light transmitting unit 222, the second solar cell 206, the second display 204, and the second power supply 244 are shown in the drawing.

The flip cover 200 includes first and second surfaces. The first surface can be the outer surface of the flip cover, and the second surface can be the inner surface of the flip cover. The first surface of the flip cover 2 includes the second solar cell 206 and the second display 204.

When the flip cover 206 is closed, the second solar cell 206 receives light from the sun and other external light sources, generates power by using the received light, and charges the second power supply 244 with the generated power. Further, the second solar cell 206 itself can be charged.

The second display 204 displays data received from the electronic device. As the second display 204, a reflective display with low power consumption, such as an EPD, can be used. For example, the power consumed to maintain an image displayed on the EPD screen of the EPD may be low, and power consumption may be required to change the image. When the EPD is included in the flip cover 200, a clock, weather information, news, stock information, and the like can be continuously displayed on the EPD screen at regular time periods or in response to information update events.

The second control unit 240 controls the overall operation of the flip cover 200. The second control unit 240 controls the flip cover 200 to process data received through the light receiving unit 226 and to display information corresponding to the received data on the second display 204. For example, the second control unit 240 controls the flip cover 200 to display information such as a clock, weather information, news, and stock information on the second display 204. Further, the second control unit 240 checks the state of charge of the second power supply 244 and transmits SOC (state-of-charge)-related data to the electronic device 400 through the light transmitting unit 222 on the basis of the checked state of charge. The electronic device 400 receives SOC-related data for the second power supply 244 of the flip cover 200 and outputs a corresponding signal to the first control unit 424. The first control unit 424 determines the state of charge of the second power supply 244 of the flip cover 200 by processing the received data and adjusts the brightness of the first display 402 on the basis of the determined state of charge. For example, when the state of charge of the second power supply 244 corresponds to a full state of charge, the first control unit 424 dims or turns off the second region of the first display 402. When the state of charge of the second power supply 244 corresponds to a state of discharge, the first control unit 424 adjusts the brightness of the second region of the first display 402 to the maximum level or turn on the second region of the first display 402.

The second power supply 244 can be charged with power that is supplied by the second solar cell 206 or the first solar cell 224, or both. The second power supply 244 transmits SOC-related information to the light transmitting unit 222 under the control of the second control unit 240. The second power supply 244 is not an indispensable element, and the first solar cell 224 and the second solar cell 206 can serve as a power supply. In this case, the second control unit 240 transmits SOC-related information for the first and second solar cells 224, 206 to the light transmitting unit 222.

The second control unit 240 controls the flip cover 200 to display images and texts on the second display 204 on the basis of data transferred from the electronic device 400.

The first solar cell 224 generates power by receiving light from the first display 402 of the electronic device when the flip cover 200 is in the closed state and generates power by receiving light from the sun and other external light sources when the flip cover 200 is in the opened state. Further, the first solar 224 itself can be charged, and the first solar cell 224 can also charge the second power supply.

The light receiving unit 226 includes a plurality of phototransistors and receives light from the first display 402 of the electronic device 400 and generates an electrical signal in response thereto. Since a plurality of pieces of data can be received through the plurality of phototransistors, it is possible to transmit data in a parallel manner. Further, the light receiving unit 226 can be set in such a manner as to be operated only when the flip cover 200 is in the closed state. The second control unit 240 can intercept power supplied to the light receiving unit 226 when the flip cover 200 is in the opened state.

The light transmitting unit 222 includes an infrared emitting diode and transmits data in a serial manner. The light transmitting unit 222 receives data related to the state of the second power supply 244 and the state of the second display 204 from the second control unit 240 and transmits the data to the electronic device 400. The light transmitting unit 222 can be set in such a manner as to be operated only when the flip cover 200 is in the closed state. The second control unit 240 intercepts power supplied to the light transmitting unit 222 when the flip cover 200 is in the opened state.

Referring to FIG. 6B, the electronic device 400, the first display 402, the sensor unit 420, the first power supply 422, and the first control unit 424 are shown in the drawing.

The first display 402 can be operated in a first mode or a second mode. The first mode is a mode for displaying an image, and the second mode is a mode for transmitting data. In the first mode, the first display 402 carries out the inherent functions of the display and displays an image. In the second mode, the first display 402 is operated in a data transmission mode for transmitting data to the flip cover 200.

The electronic device 400 operates the first display 402 in the first mode for displaying an image when the flip cover 200 is in the opened state and operates the first display 402 in the second mode for transmitting data to the flip cover 200 when the flip cover 200 is in the closed state. Whether the flip cover 200 is in the "opened" or "closed" state can be determined on the basis of an output from the sensor unit 420 included in the electronic device 400.

The sensor unit 420 includes a light sensor, a proximity sensor, a gesture sensor, and a magnetic sensor. Alternatively, the sensor unit 420 includes an ambient light and proximity sensor in the form of one component combining a light sensor, a proximity sensor, and a gesture sensor.

The ambient light and proximity sensor include a light emitting unit for emitting infrared light and a light receiving unit for receiving reflected infrared light, and have a hole or via for the light emitting unit and a hole or via for the light receiving unit. The light emitting unit includes an infrared emitting diode. The light receiving unit includes at least one photodiode. The ambient light and proximity sensor simultaneously serves as a proximity sensor, a light sensor, or a gesture sensor, or a combination thereof.

In the case of serving as a proximity sensor, when an object approaches the ambient light and proximity sensor, infrared light emitted from the light emitting unit and reflected by the object is received by the light receiving unit, and accordingly the ambient light and proximity sensor outputs a signal corresponding to the proximity of the object. The control unit turns the screen on or off based on the signal. The function of the ambient light and proximity sensor as a proximity sensor is used to detect whether a user puts the electronic device up to his or her ear during a phone call or views the screen of the electronic device, and the control unit reduces power consumption by turning off the screen when a user puts the electronic device up to his or her ear.

In the case of serving as a light sensor, the ambient light and proximity sensor outputs a signal corresponding to an ambient brightness. The control unit adjusts the state of the screen on the basis of the signal. The function of the ambient light and proximity sensor as a light sensor is used to detect an ambient brightness or illumination and correspondingly adjust the brightness or color of the screen.

In the case of serving as a gesture sensor, infrared light emitted from the light emitting unit and reflected by an object approaching the ambient light and proximity sensor can be received by a plurality of photodiodes constituting the light receiving unit, and accordingly the ambient light and proximity sensor outputs a signal corresponding to the movement and direction of the approaching object. The control unit detects the movement and direction of the approaching object on the basis of the signal.

The first control unit 424 receives a signal output from the sensor unit 420 and determines whether the flip cover 200 is in the opened or closed state on the basis of the received signal.

For example, the light sensor detects external light and correspondingly outputs a signal. The first control unit 424 receives the signal output from the light sensor and determines whether the flip cover is in the opened or closed state on the basis of the received signal. Further, when the flip cover 200 is closed, the light sensor receives light output from the light transmitting unit 222 of the flip cover 200 and outputs an electrical signal corresponding thereto to the first control unit 424.

The proximity sensor detects the proximity of the flip cover as the flip cover approaches the electronic device and outputs a signal corresponding thereto. The first control unit 424 receives the signal output from the proximity sensor and determines whether the flip cover is in the opened or closed state on the basis of the received signal.

The magnetic sensor detects magnetic flux from the magnet mounted on the flip cover 200 and outputs a signal corresponding thereto. The first control unit receives the signal output from the magnetic sensor and determines whether the flip cover is in the opened or closed state on the basis of the received signal.

The sensor unit uses an ambient light and proximity sensor into which a light sensor and a proximity sensor are combined. The ambient light and proximity sensor includes a light emitting unit and a light receiving unit, and detects the proximity of an object by receiving light emitted from the light emitting unit by the light receiving unit. The light receiving unit of the ambient light and proximity sensor further receives external light and serves as a light sensor. The first control unit processes a signal output from the ambient light and proximity sensor and determines whether the flip cover 200 is in the opened or closed state on the basis of the processed signal.

The first control unit 424 controls the overall operation of the electronic device 400. Further, the first control unit 424 determines whether the flip cover is in the opened or closed state on the basis of a signal output from the sensor unit. The first control unit 424 operates the first display 424 in the first or second mode depending upon whether the flip cover is in the opened or closed state. The first control unit 424 operates the first display 402 in the first mode when the flip cover is in the opened state. In the first mode, the first display 402 displays an image.

The first control unit 424 operates the first display 402 in the second mode when the flip cover is in the closed state. In the second mode, the first display 402 can be operated in a data transmission mode. In the data transmission mode, a data pattern corresponding to data to be transmitted can be displayed on the second region of the first display 402.

If the flip cover 200 is closed, then the first control unit 424 turns off all regions other than the first region and the second region of the first display or allows all regions other than the first region and the second region to be black, thereby adjusting the brightness of the first display.

In order to charge the first solar cell 224 included in the flip cover 200, the first control unit 424 turns on the second region of the first display or displays an image with the maximum brightness on the second region of the first display.

Further, the first control unit 424 displays a data pattern for data transmission on the first region of the first display. In order to transmit data in a parallel manner, the first control unit 424 divides the first region into at least two sub-regions. Transmitting data in a parallel manner refers to transmitting at least two pieces of data at a time. The first control unit 424 transmits binary data to the flip cover 200 by displaying a pattern corresponding to a binary value of "1" or "0" on each sub-region. Further, the first control unit 424 displays a pattern corresponding to a binary value of "1" or "0" by turning on or off each sub-region. For example, each sub-region can be white or turned on when a corresponding bit of data to be transmitted has a value of "1" and can be black or turned off when the corresponding bit has a value of "0".

Alternatively, each sub-region can be displayed at 80% or greater of the maximum brightness level when a corresponding bit of data to be transmitted has a value of "1" and can be displayed at 20% or less of the maximum brightness level when the corresponding bit has a value of "0".

Further, when the flip cover 200 is in the closed state, the first control unit 424 uses the second region of the first display as a light emitting source for enabling the first solar cell included in the flip cover 200 to generate power. The first control unit 424 determines whether the flip cover 200 is in the "opened" or "closed" state on the basis of a signal output from the sensor unit 420.

For example, the first control unit 424 determines whether the flip cover 200 is in the "opened" or "closed" state on the basis of a signal output from the magnetic sensor included in the sensor unit 420. When the flip cover 200 is determined to be in the "closed" state, the first control unit 424 receives data from the flip cover 200 on the basis of an output from the ambient light and proximity sensor included in the sensor unit 420.

That is, the first control unit 424 determines whether the flip cover 200 is in the "opened" or "closed" state on the basis of an output from the magnetic sensor of the sensor unit 420, receives data from the flip cover 200 on the basis of an output from the ambient light and proximity sensor of the sensor unit 420 when the flip cover 200 is in the "closed" state, and turn off the entire first display or adjusts the overall brightness of the first display on the basis of an output from the ambient light and proximity sensor when the flip cover 200 is in the "opened" state.

Further, the first control unit 424 adjusts the brightness of some regions of the first display or turns off some regions of the first display on the basis of data received from the flip cover 200. For example, when the flip cover 200 is in the "closed" state, the sensor unit 420 receives light output from the light transmitting unit 222 of the flip cover 200 and outputs an electrical signal to the first control unit 424 in response thereto. The first control unit 424 checks the state of charge of the second power supply 244 of the flip cover 200 on the basis of the signal received through the sensor unit 420. The first control unit 424 adjusts the brightness of the second region of the first display 402 on the basis of the state of charge of the second power supply 244. Further, the first control unit 424 adjusts the brightness of the second region of the first display 402 on the basis of the states of charge of the first and second solar cells.

For example, when the state of charge of the second power supply 244 corresponds to a full state of charge, the first control unit 424 dims or turns off the second region of the first display 402. The first control unit 424 adjusts the brightness of the second region of the first display 402 to a higher level when the second power supply 244 needs to be charged.

The first power supply 422 supplies various electronic components included in the electronic device 400 with power. That is, the first power supply 422 supplies power to the first display 402, the sensor unit 420, and the first control unit 424.

According to various embodiments of the present disclosure as described above, data can be transmitted to the flip cover 200 by using the first display 402 included in the electronic device 400, or the first solar cell 224 and the second power supply 244 included in the flip cover 200 can be charged using the first display 402.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A flip cover configured to connect to an electronic device including a first display, the flip cover comprising:
   a first surface including a second display;
   a second surface disposed to be opposite to the first display, the second surface including at least one light receiving unit; and
   a second control unit configured to control the flip cover to:
      receive light emitted from the first display through the at least one light receiving unit,
      covert the received light to an electrical signal, and
      display information on the second display as a function of the converted electrical signal.

2. The flip cover of claim 1, wherein the second surface further includes a first solar cell configured to receive light emitted from the first display and to generate power by using the received light.

3. The flip cover of claim 1, wherein the second surface further includes a light transmitting unit configured to transmit data to the electronic device.

4. The flip cover of claim 3, wherein the light transmitting unit is configured to transmit data to the electronic device in a serial manner.

5. The flip cover of claim 1, wherein the at least one light receiving unit is configured to receive data from the first display in a parallel manner.

6. The flip cover of claim 1, wherein the first surface further includes a second solar cell.

7. An electronic device configured to connect to a flip cover, the flip cover having an opened state and a closed state, the electronic device comprising:
   a first display;
   a sensor unit; and
   a first control unit configured to:
      determine whether the flip cover is in the opened state or the closed state based on an output from the sensor unit, and
      when the flip cover is in the closed state, control the electronic device to transmit data to the flip cover by displaying a data pattern on a first region of the first display,
   wherein the data pattern comprises a brightness that varies corresponding to a binary value of the data.

8. The electronic device of claim 7, wherein the first control unit is configured to divide the first region into at least two sub-regions and configured to display a data pattern corresponding to a binary value of the data on each sub-region.

9. The electronic device of claim 7, wherein the first control unit is configured to adjust the brightness of a second region of the first display so as to enable a first solar cell included in the flip cover to generate power.

10. The electronic device of claim 7, wherein the sensor unit is configured to receive data transmitted from the flip cover.

11. The electronic device of claim 10, wherein the first control unit is configured to process the data in a serial manner.

12. An electronic device capable of connecting to a flip cover, the flip cover including a light receiving unit and a second display, the electronic device comprising:
   a first display;
   a sensor unit; and a first control unit configured to, on the basis of a signal output from the sensor unit, control the electronic device to be operated in a first mode for displaying an image on the first display or in a second mode for transmitting data to the flip cover, wherein the first display is configured to display a plurality of patterns corresponding to a binary value of the data on a first region of the first display in the second mode.

13. The electronic device of claim 12, wherein the first region is disposed to be opposite to the light receiving unit of the flip cover.

14. The electronic device of claim 12, wherein the flip cover further includes a first solar cell, and the first display is configured to adjust a brightness of a second region of the first display in the second mode so as to enable the first solar cell of the flip cover to generate power.

15. The electronic device of claim 14, wherein the second region of the first display is disposed to be opposite to the first solar cell of the flip cover.

16. The electronic device of claim 12, wherein the sensor unit is configured to receive data from the flip cover in a serial manner.

17. The electronic device of claim 12, further comprising a camera configured to receive data from the flip cover in a serial manner.

* * * * *